(No Model.) 3 Sheets—Sheet 2.

D. J. BOWSER.
CORN PLANTER.

No. 504,321. Patented Sept. 5, 1893.

Witnesses
Jas. K. McCathran
J. H. Siggers

Inventor
David J. Bowser
By his Attorneys,
C. A. Snow & Co.

(No Model.) 3 Sheets—Sheet 3.
D. J. BOWSER
CORN-PLANTER.
No. 504,321. Patented Sept. 5, 1893.
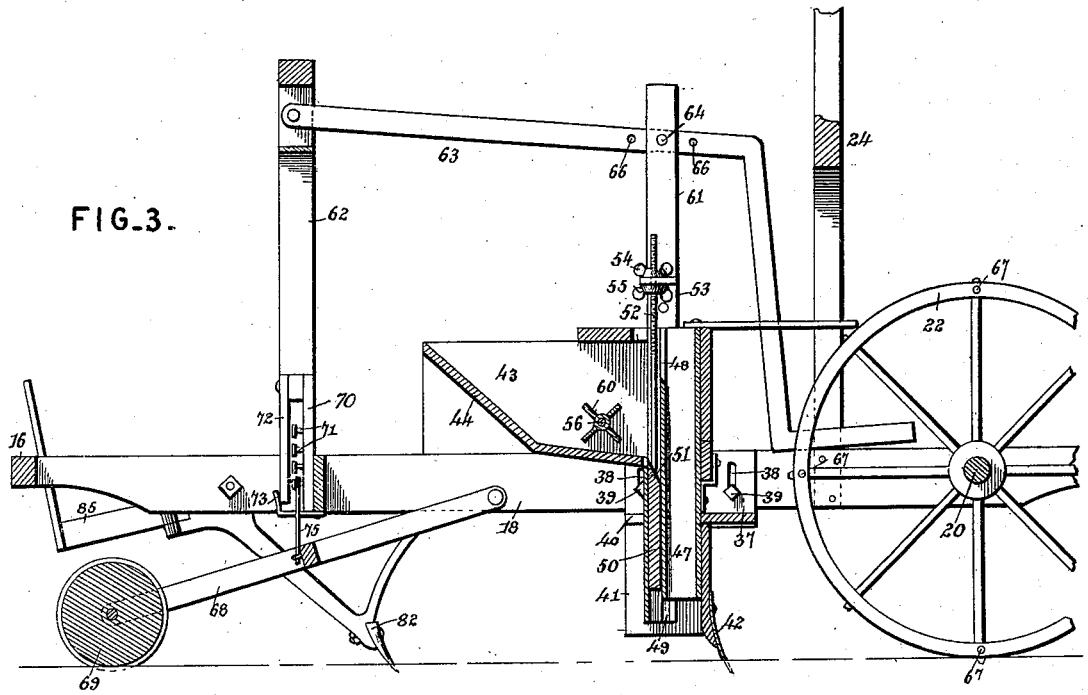
FIG. 3.
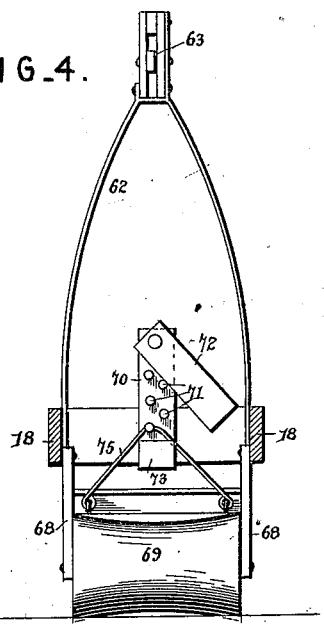
FIG. 4.
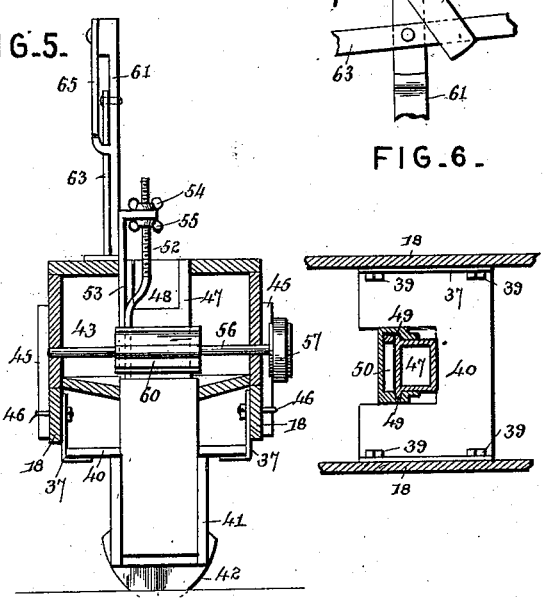
FIG. 5.
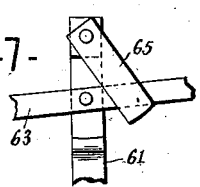
FIG. 7.
FIG. 6.
Witnesses
Jas. K. McCathran
J. N. Liggers
Inventor
David J. Bowser
By his Attorneys,
C. A. Snow & Co.

UNITED STATES PATENT OFFICE.

DAVID J. BOWSER, OF LUCAS, MICHIGAN.

CORN-PLANTER.

SPECIFICATION forming part of Letters Patent No. 504,321, dated September 5, 1893.

Application filed January 16, 1893. Serial No. 458,487. (No model.)

*To all whom it may concern:*

Be it known that I, DAVID J. BOWSER, a citizen of the United States, residing at Lucas, in the county of Missaukee and State of Michigan, have invented a new and useful Corn-Planter, of which the following is a specification.

My invention relates to improvements in corn planters; and has for its object to provide a corn-planter adapted to simultaneously plant three rows of corn, to open the furrows for the reception of the corn and subsequently cover the same; to form the drills with accuracy; to drop the corn in regulated quantities; and to be readily thrown into and out of operative position for transportation to and from the field of operation.

With these objects in view the invention consists in certain features of construction hereinafter specified and particularly pointed out in the claims.

Figure 1:
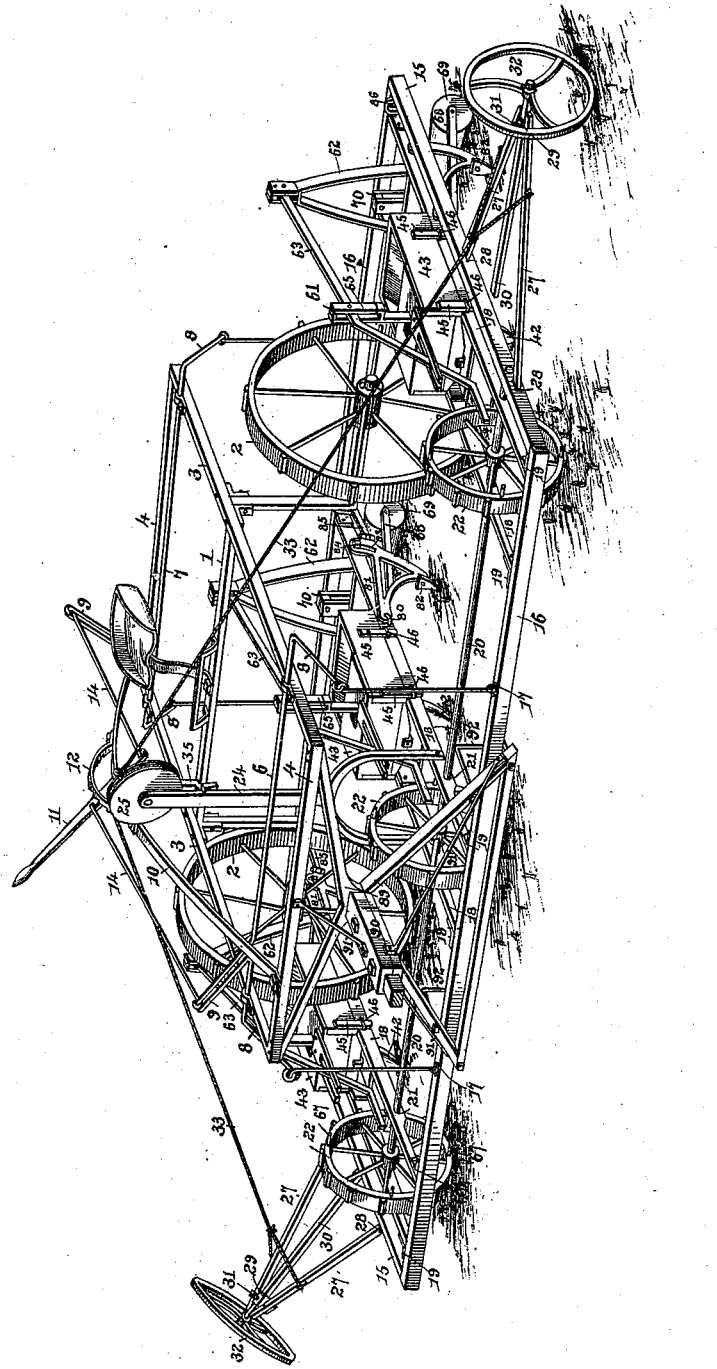
Figure 2:
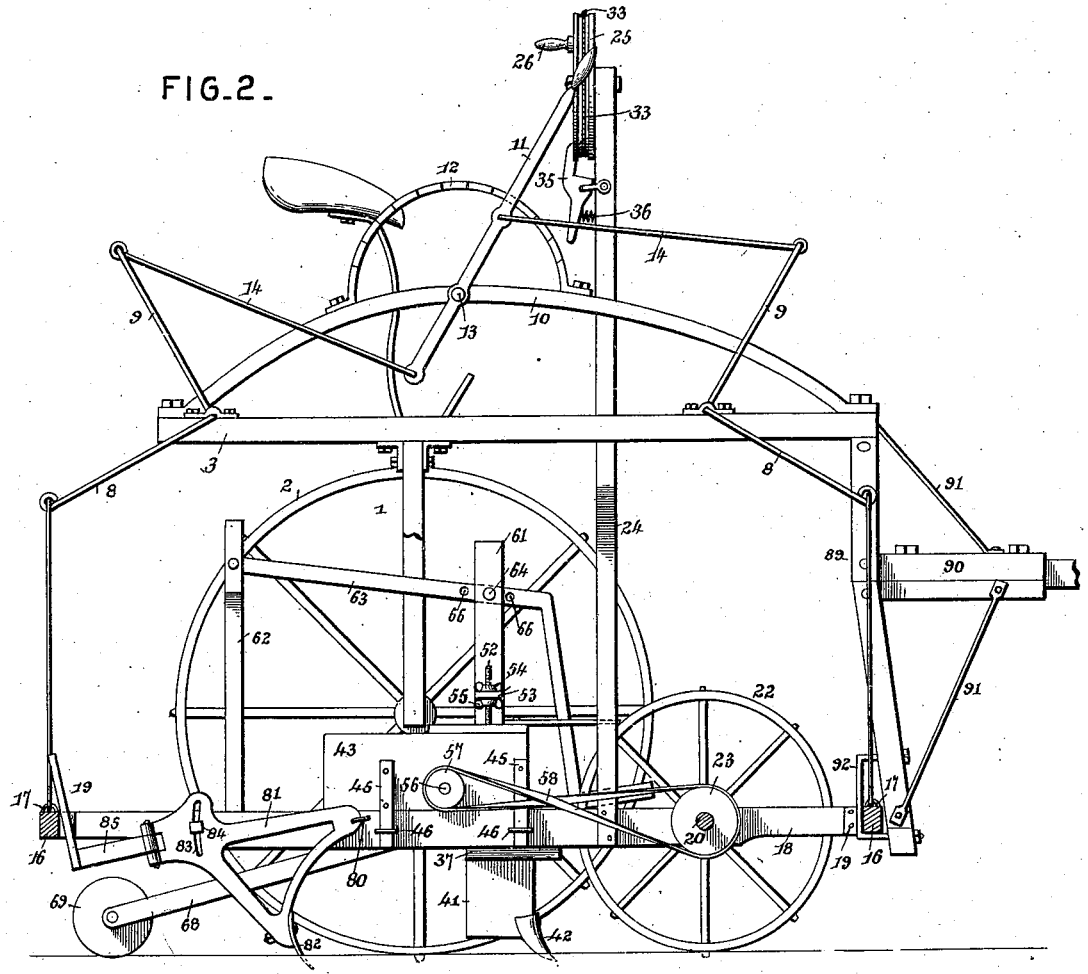
Figure 8:
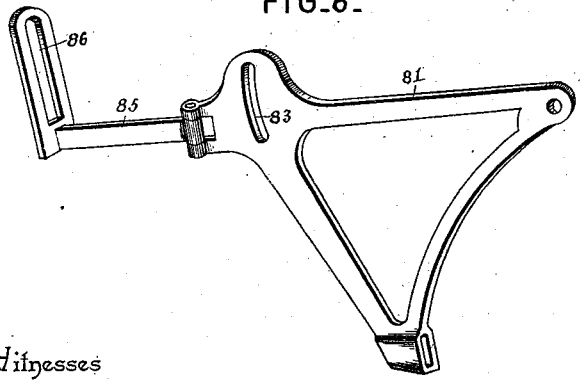
Figure 9:
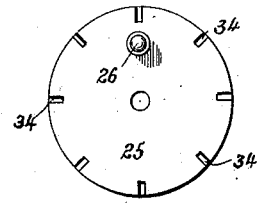

Referring to the drawings:—Figure 1 is a perspective view of a machine constructed in accordance with my invention. Fig. 2 is a vertical sectional view, a planting mechanism being shown in side elevation. Fig. 3 is a similar section through one of the planters. Fig. 4 is a transverse vertical sectional view of one of the coverer carrying frames. Fig. 5 is a similar view through the hopper. Fig. 6 is a horizontal section through a portion of a planter carrying frame, seed and measuring tubes. Fig. 7 is a detail in elevation of the connection between the measure operating lever and its standard. Fig. 8 is a detail in perspective of one of the shovel carrying standards. Fig. 9 is a detail in elevation of the hand-wheel for operating the markers.

Like numerals of reference indicate like parts in all the figures of the drawings.

In practicing my invention I employ an arched axle 1, whose extremities are reduced and carry ground-wheels 2. A rectangular frame comprising opposite side and end-bars designated as 3 and 4, respectively, surmounts the axle and is of a width agreeing with the arched-portion thereof, to the angles or corners of which said frame is rigidly secured. A driver's seat-supporting standard rises from the center of the arch, and in front of the same a foot-rest is located.

In bearings located upon the side-bars 3 near the front and rear ends of the rectangular frame that surmounts the axle, there is journaled a front and a rear rock-shaft, designated as 6 and 7, respectively. These rock-shafts are provided at their extremities with angularly-disposed rock-arms 8, and at one side of their centers with intermediate rock-arms or crank-portions 9. A yoke 10, spans the frame from front to rear and has fulcrumed thereon between its ends a hand-lever 11, at one side of which there is supported by the yoke a curved locking-standard 12. The lever 11, is fulcrumed as at 13, between its ends, and above its fulcrum is designed to engage with the locking-standard. Connecting-rods 14, lead from the intermediate crank or rock-arms of the rock-shafts to points above and below the fulcrum of the lever, so that by any movement of the lever the said rock-arms are swung in reverse directions and the end rock-arms of said shafts either simultaneously raised or lowered as the case may be.

Inclosing the ground-wheels and located below the before-described rectangular frame that is supported by the axle is a transversely-disposed oblong movable frame comprising opposite side bars 15 and front and rear end bars 16. At each side of their centers the end-bars 16 are provided with eyes 17, and connecting-rods extend from the eyes to the extremities of the rock-arms at the ends of the rock-shafts arranged thereover, so that as will be apparent the raising and lowering of the said rock-arms causes a raising and lowering of the oblong movable-frame.

Below the arch of the axle and at either side of the ground-wheels there is located the frames for carrying the planting-mechanism, and these frames each comprises a pair of opposite parallel side-bars 18, whose ends are rigidly secured by angle-plates 19 to the front and rear end-bars 16 of the movable frame. A rotatable shaft 20, has its ends journaled in the side-bars 15 of the oblong movable frame and between its ends is passed through bearings 21, formed in the side-bars 18, of the planter-frames. Between each pair of side-bars, there is made fast to the shaft 20 a wheel 22; and at one side of each frame there is made fast to said shaft 20 a pulley 23. An arched-standard 24, has its lower ends or terminals secured rigidly to the side-bars 18 of the central planter-frame, and the upper end of said standard projects up above the upper stationary rectangular-frame that is supported by the axle. At its upper end in front and slightly to one side of the driver's seat there is journaled upon a stub-shaft a grooved wheel 25. The wheel 25 is provided upon its rear face with an ordinary handle 26 by which it may be manipulated by the hand of the driver.

A pair of converging bars 27, are hinged as at 28, to each of the side-bars 15 of the rectangular movable frame, and a sleeve-plate 29, is secured to the converging ends of said bars. In each sleeve-plate there is mounted for sliding a bar 30, which is made adjustable within the sleeve through the medium of a set-screw 31, located in the sleeve. Upon the outer end of each of the bars 30 there is journaled a marking-wheel 32. A light rope 33 has its opposite ends connected to the converging bars 27 at the opposite sides of the machine, and between its ends is passed around and secured to the hand-wheel 25, so that when said hand-wheel is rotated in one direction one terminal of the rope is wound upon the wheel while the remaining terminal is paid out, and thus it will be seen that when one marking-wheel is being elevated out of position the other is being lowered to position. In order to provide for locking the hand-wheel at any point of its rotation the rear face of the same is provided with notches 34, and below said wheel a pawl 35 is pivoted upon the standard 24, a spring 36 being interposed between the tail of the pawl and said standard so as to throw its upper end into engagement with a convenient notch of the wheel. The operator or driver perched upon the seat may readily depress the pawl, with his foot while at the same time he operates the wheel by hand.

Between each pair of side-bars 18 of the planter frames there is located a U-shaped plate 37, said plate having its upturned ends slotted as at 38, and adjusting-bolts 39, are passed through said ends into the side-bars 18, whereby as will be obvious the said plates may be raised and lowered and secured in their adjusted positions within the planter-frames. A square opening 40, is formed in the U-shaped plate, and from the same depends a hollow drill-standard 41, at the front and lower end of which is secured a furrow-opening shovel 42. Through the medium of these bolts it will be seen that the drill-standards may be raised and lowered for the purpose of forming the furrow a desired depth.

Seated upon each pair of side-bars 18 is a hopper 43, said hopper being provided with a rear inclined bottom 44. Cleats 45, are secured to the sides of the hopper and the lower ends of said cleats, pass through keepers or staples 46, located upon the side-bars 18 of the planter-frames. A tube 47, extends from an opening in the top of the hopper, down through a similar opening in the bottom thereof and into a drill-standard 41 terminating directly in rear of the furrow-opening shovel. This tube at its upper end has a portion of its rear wall cut away forming an opening 48.

At opposite sides of the tube in the top and bottom of the hopper, guide-recesses 49 are formed, and in these guide-recesses and embracing the rear face and sides of the tube is a movable or reciprocating feeder or measure 50, the same having a general U-shape in cross-section and adapted to slide above and below the opening in the upper end of the rear wall of the seed-tube. The tube is provided with an internal inclined bottom 51, and a rod 52 from said tube extends upwardly through the opening in the top of the hopper and through a perforation in an L-shaped bracket 53 which extends from the upper end of the measure. This rod is threaded, and adjustable thumb-nuts 54 and 55 are located thereon above and below the perforation. By adjusting these thumb-nuts, the bottom being movable within the measure, and the rod secured thereto, while the bracket is secured to the measure itself, it will be seen that said bottom may be raised and lowered within the measure thus increasing or decreasing its capacity.

Journaled in the side-walls of each of the hoppers is a transverse shaft 56, one end of each of the shafts projecting beyond one of the side walls and being provided with a small pulley 57. A cross-belt 58, serves to connect each pulley 57 with the pulley 23 located in front of the same so that the shaft 20 and pulleys 23 and 57 are all operated in unison.

Upon each shaft 56 within the hopper there is located a fluted or winged agitator-wheel 60, the same being directly in rear of the vertically reciprocating measure and therefore designed to feed the corn to said measure as the same is reciprocated and the shaft rapidly rotated. The operation of this feed device will be readily understood, in that it simply consists in a lowering of the measure, a filling of the same, an elevation of the measure, and a depositing by the inclined bottom of the contents of the measure into the upper end of the seed-tube through which the corn drops into the bottom of the furrow thus formed.

It will be seen that the capacity of the measure may be regulated, and at each stroke it receives its full quantity.

Rising from each of the inverted L-shaped brackets above each hopper is a slotted standard 61, and from the frame of each planter in rear of each hopper there rises an arched-standard 62. A lever 63, has its rear end passed through and pivoted within the arched-standard 62, while its intermediate portion is loosely connected by a pin 64, to the slot or recess of the said standard that rises from the bracket. At one side of the slot a pivoted plate or keeper 65 is located, so that as will be obvious said lever may be retained in its position upon the pin. The lever is provided with a series of perforations 66, and may be adjusted upon the pin through the medium of said perforations. The front end of the lever depends into the path of a series of pins 67, that project from the side of the ground-wheel 22. By this means the measure is vertically reciprocated as the machine passes over the ground all as will be obvious.

Rectangular frames 68, are pivoted at their front ends to the planter-frames in rear of the hoppers, and each of said frames has journaled in its rear end a roller 69. Vertical standards 70 extend from a suitable cross-bar in each of the planter-frames upwardly, and said vertical standards are provided upon their rear faces with a series of pins 71. Locking-plates 72 are pivoted to the upper ends of the standards and are secured at their lower or free ends by spring-clips 73. Triangular bails 75 are loosely connected to the cross-bars of the roller-frames, and at their upper ends are designed to engage over a convenient pin. When thus engaged the locking-plates are swung to a closed position so as to retain said bails upon the pins, and in this manner the roller may be depressed or elevated and consequently depress or elevate the covering-shovels which I will now proceed to explain.

At each side of each planter frame there is loosely connected by staples or clevises 80, triangular standards 81, which carry at their lower ends covering shovels 82. These standards are provided with vertical slots 83, and through the slots into the sides of the planter-frames are passed set-bolts 84, whereby, as will be obvious, the said standards are capable of vertical adjustment. Hinged to the rear ends of said standards are L-shaped arms 85, the same having their outer or vertical portions provided with slots 86. By removing the set-bolts 84 and swinging the standards out from the frames and swinging the arms 85 inward against the frames so that their slotted portions 86 will rest against the beams and passing said bolts therethrough, it will be seen that the standards are maintained or held at their rear ends away from the beams a greater distance apart and thus adapted for carrying wider shovels, all as will be apparent.

An X-shaped frame 89 comprising diagonally-disposed bars depends from the front cross-bar 4 of the upper frame. At the juncture of the diagonally-disposed bars composing this frame there is located a socket 90, and said socket is adapted to receive a draft-pole suitably secured therein. Bracing wires 91 extend from the socket to the cross-bar of the frame 4 and to the diagonal bars forming said draft frame. Keepers 92 are located upon the lower portions of the diagonal arms and loosely embrace the front cross-bar 16 of the lower movable frame, so that as will be obvious, the draft is taken from the two frames, that is, the upper fixed frame and the lower movable frame, and concentrated at the center of the draft frame, which is at such a height as to be adapted for the team.

It will be seen that in going to and from the field of operation by a manipulation of the hand-lever the oblong frame and the planters may be raised entirely from contact with the ground and thus supported in a suspended position during the travel of said machine, or a similar operation may take place at the ends of the drills or furrows.

It will be seen that the machine is capable of simultaneously opening a series of three furrows, subsequently depositing the seed therein, and finally covering and rolling said furrows, so that three complete furrows are formed at one and the same operation. It will furthermore be seen that the machine is not at all complex, and that all the parts are within the reach of the driver and capable of being conveniently manipulated by him.

Certain detail features of construction, it will be understood, may be altered to suit the fancy and taste of the manufacturer, and I do not limit my invention therefore to the exact details herein described and shown but hold that I may vary the same to any extent and degree within the scope of mechanical skill.

Having described my invention, what I claim is—

1. In a planter, the combination with an arched axle, a frame supported thereby, rock-shafts mounted on the frame, and ground-wheels at the ends of the axle, of a lower movable frame, planting-mechanism carried thereby a lever fulcrumed on the upper frame, connections between the crank-arms on the frames and the lever, and connections between the rock-arms of said shafts and the lower planter-carrying frame, substantially as specified.

2. In a planter, the combination with an arched-axle, a superimposed frame, ground-wheels for the axle, a lower oblong frame embracing the ground-wheels, planters carried by said oblong frame, and means for raising and lowering said oblong frame and planters, substantially as specified.

3. In a planter, the combination with an arched-axle, ground-wheels, a frame supported by the axle, a hand-wheel supported above the frame, and means for locking said hand-wheel, of a movable frame embracing the ground-wheels, planters carried thereby, markers hinged at the sides of the movable frame, and ropes connected with the markers and made fast to the hand-wheel, substantially as specified.

4. In a planter, the combination with the arched-axle, the superimposed frame, the ground-wheels for the axle, and the lower planter-carrying oblong frame embracing the ground-wheels, of a draft-frame depending from the upper frame and having a central socket for the reception of the pole and loosely connected with said lower movable frame, and means for raising and lowering said movable frame, substantially as specified.

5. In a planter, the combination with the arched-axle, the ground-wheels and the rectangular frame supported by the axle, of the oblong frame embracing the ground-wheels, means for raising and lowering said oblong frame, and planter-carrying frames located under the arch and between the ground-wheels and outer ends of said movable frame and secured to said movable frame, and means for raising and lowering said movable frame, substantially as specified.

6. In a planter, the combination with the arched axle, the ground-wheels for the same, and the rectangular frame arranged upon the axle, of the oblong frame embracing and extending beyond the ground-wheels, means for raising and lowering said oblong frame, a series of planter-frames located between the front and rear bars of said oblong movable frame, planter-mechanism carried thereby, and comprising a rotatable agitator, the shaft rotatably mounted in the oblong frame and extending through the planter-frames, and means for rotating the shaft, pulleys carried by the shaft, and belts leading from the pulleys to the agitator, substantially as specified.

7. In a planter, the combination with the frame thereof, of opposite hinged marker-carrying frames, an intermediate standard, a hand-wheel having a handle mounted on the standards and provided upon its rear face with notches, a pawl pivoted on the standard below the wheel, a coiled spring interposed between the tail of the pawl and standard for normally engaging the upper end thereof and the notches, and a rope having its extremities connected to the marker-frames and its intermediate point connected to the wheel, substantially as specified.

8. In a planter, the combination with the opposite side-bars thereof, the furrow-opening shovels and seed-dropping-mechanism, of opposite standards hinged at their front ends to the side-bars of the frame in rear of the planting-mechanism and provided at their rear ends with slots, set-bolts passed through the slots and sides of the standards, and L-shaped arms hinged to the rear ends of the standards and provided at their free ends with slots and adapted to be swung inward against the side-bars of the planters at an angle to the standards and receive said bolts, whereby said standards are supported outward or away from the sides of the planter, substantially as specified.

9. The combination with the side-bars of a planter, of a hinged frame, a roller journaled in the rear end of the frame, a bail loosely connected with an intermediate cross-bar of the roller-frame, a standard rising from one of the cross-bars of the planter-frame and provided with studs for engaging the bail, and a plate pivoted to the standard and adapted to swing over the studs and bail, substantially as specified.

10. In a planter, the combination with the hopper and frame thereof, of a seed-tube depending from the hopper and extending above the bottom thereof, said tube being provided with an opening, and a vertical sliding measure, having an inclined bottom mounted, adjacent to the tube and means for raising and lowering said measure, and limiting the upward movement thereof, substantially as specified.

11. In a planter, the combination with the hopper and framework thereof, of a seed-tube passing through the top and bottom of the hopper and provided at its rear side at its upper end with an opening, a U-shaped measure embracing the tube and mounted in ways at the sides thereof, means for raising and lowering the measure, and an inclined bottom located in said measure, substantially as specified.

12. In a planter, the combination with the hopper thereof, and a seed-tube depending from the bottom of the hopper, extending through the same, and provided in its rear wall at its upper end with an opening, a sliding measure embracing the tube, means for operating the measure, a rotatable feed located in rear of the measure, and means for operating said feed, substantially as specified.

13. In a planter, the combination with a hopper thereof, a seed-tube extending through the bottom of the hopper and provided with an opening, a measure mounted for sliding adjacent to the tube, means for operating said measure, a transverse shaft journaled in the walls of the hopper in rear of the measure, a fluted agitator mounted on the shaft, a pulley on the outer end of the shaft, and means for driving the same, substantially as specified.

14. In a planter, the combination with the hopper, framework, and a seed-tube passing through the bottom of the hopper and extending above the same and provided with an opening, of a sliding measure embracing the tube, a bracket rising from the measure and extending above the tube and having a lateral extension, a standard pivoted upon the bracket, a rear standard upon the framework, a lever pivoted in the rear standard and to the standard of the bracket and having its front end depending in front of the hopper, a ground-wheel having pins adapted to strike and operate the lever and thus raise and lower the measure, a bottom movably mounted in the measure, a threaded rod extending upwardly from the bottom through a perforation in the extension of the bracket, and set nuts threaded on the rod above and below the extension, substantially as specified.

15. The combination with a planter, having opposite side-bars and a hopper, of a U-shaped plate having its upturned ends slotted and provided with a central opening, bolts passed through the slots of the upturned ends and side-walls of the frame, a hollow drill standard depending from the opening in the plate and carrying the furrow-opening shovel, a seed-tube depending through the hollow drill standard and having an opening above the hopper, a sliding measure mounted on the seed-tube means for operating said measure, and means for feeding the corn to the measure, substantially as specified.

In testimony that I claim the foregoing as my own I have hereto affixed my signature in the presence of two witnesses.

DAVID J. BOWSER.

Witnesses:
J. A. TORREY,
R. M. BIELBY.